United States Patent Office 3,467,071
Patented Sept. 16, 1969

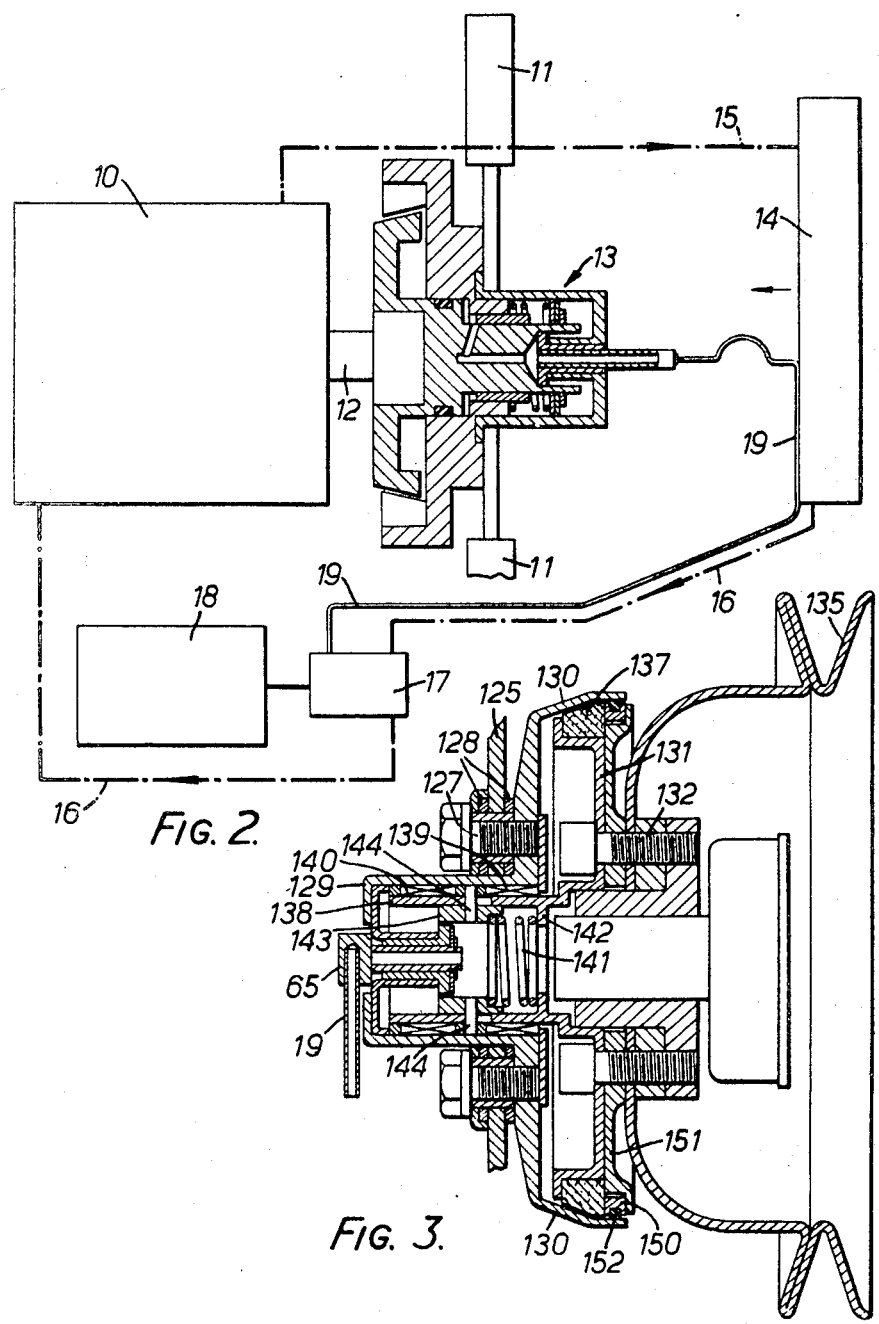

3,467,071
THERMALLY-RESPONSIVE CONTROL MECHANISMS
Arthur Ernest Henry Elmer, Painswick, England, assignor to Dynair Limited, Stroud, Gloucestershire, England, a British company
Filed July 11, 1966, Ser. No. 654,135
Claims priority, application Great Britain, July 15, 1965, 30,069/65; Nov. 18, 1965, 49,124/65
Int. Cl. F01p 7/08
U.S. Cl. 123—41.12                11 Claims

ABSTRACT OF THE DISCLOSURE

A thermally controlled pneumatically operated rotary cooling fan in which the fan blades are mounted on a hub which constitutes the cylinder of a pneumatic ram and also carries a friction clutch member, the hub being supported by bearings on an inner boss rigidly fixed to a drive member and constituting a ram piston, the boss also carrying the other element of the friction clutch. Compressed air to operate the ram so as to engage the clutch is admitted through a rotary coupling passing through the end wall of the ram cylinder at the side of the fan remote from the drive member such that when the clutch is engaged all parts except the fluid coupling rotate bodily with the drive member.

---

Figure 1:
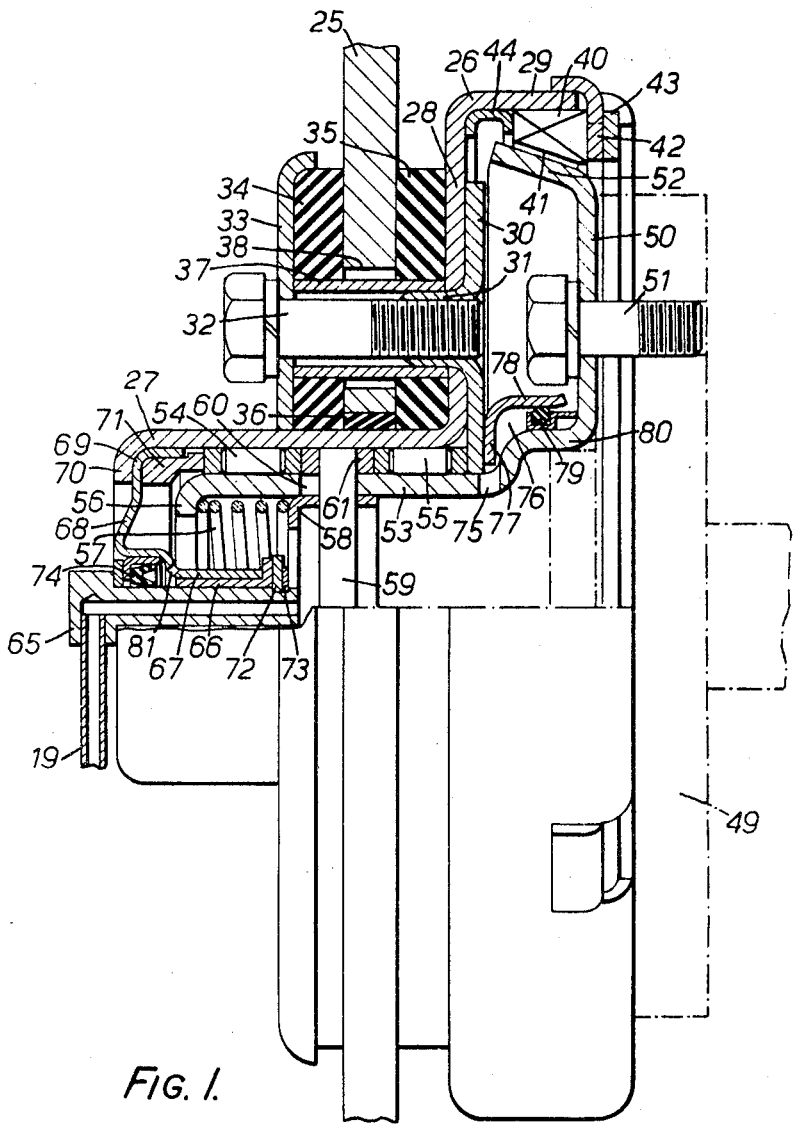

This invention relates to thermally-responsive control mechanism for controlling the power input to rotary bladed machines so as to control the rate at which fluid passes through the machine. The invention is particularly applicable to rotary fluid pumps or fans for a coolant medium, variations in the speed of the machine being used to control the flow of the coolant medium and hence the overall cooling effect. The invention is particularly applicable to cooling systems of internal combustion engines for road vehicles, aircraft, locomotives, marine purposes, or stationary engines, and may also be applied to air conditioning systems. However, as will become apparent, the invention is of particular advantage in connection with cooling fans for impelling the cooling air stream through a radiator of a water-cooled engine or over the heat exchange surfaces of an air cooled engine.

In many applications, and particularly in the case of internal combustion engines for vehicles, the cooling requirements are subject to wide variations dependent upon the operating conditions. For example, when starting from cold little or no cooling is required until the engine has reached a predetermined temperature. Also during running the degree of cooling required varies greatly in accordance with the load and with external conditions such as air temperature and wind velocity relative to the vehicle. A cooling fan absorbs a considerable proportion of the total output power of an engine and considerable economies can be effective if the power absorption of the fan is reduced when cooling is not required or only required on a reduced level.

Accordingly it is an object of the invention to provide an improved control for a rotary fluid pump or fan for a coolant medium which will be simple and economical to manufacture and effective in reducing the power consumption when cooling requirements are low.

From one aspect the invention consists in a control apparatus for a fixed pitch cooling fan including thermally-responsive pneumatically operated servo mechanism for controlling a friction clutch in the drive to the fan.

From another aspect the invention consists in a rotary bladed fluid pump or fan having a transmission including a friction clutch, and means for controlling the engagement and disengagement of the clutch automatically by means of a thermally-responsive device.

The control means will preferably include a fluid-operated ram, actuated by servo pressure controlled by the thermally-responsive device. Such a ram can exert substantial engaging forces on the clutch, with limited overall dimensions. Where the invention is applied to an air fan it is preferred to use a pneumatic servo since any small leakage of air from the servo system will be unharmful. More generally the servo fluid is of the same composition as the fluid passing over the blades of the machine.

In the case of a cooling fan impelling air through a radiator the air temperature may not be the best indication of the cooling requirements. A more direct positive indication may be obtained in such circumstances from the water passing through the cylinder jacket. Thus according to a preferred feature of the invention, the machine forms part of a cooling system including a heat exchanger, over one section of which flows a coolant medium conveyed by the pump or fan, while the thermally-responsive element is sensitive to the temperature of the fluid flowing through the other section of the heat exchanger.

In the case of a conventional water cooled engine the thermal responsive means would preferably be positioned adjacent to the lower radiator connection so as to be sensitive to the temperature of the water entering the engine cooling jacket.

Where the servo system is of a pneumatic type either compressed air or vacuum operation may be used depending upon the type of engine and the associated auxiliary equipment. In some cases a vacuum servo may be employed using suction derived from the engine intake manifold. Preferably, however, the servo system will be connected to a compressed air or vacuum supply derived from a compressor or exhauster driven by the engine itself, or from a supercharger or exhaust turbo-supercharger.

Preferably the ram and ram cylinder are connected to rotate respectively with the input and output sections of the clutch. Also the apparatus conveniently includes a non-rotary servo-pressure line, and a rotary seal between the servo-pressure line and a part rotating with the machine.

When the clutch is disengaged it is important that any friction in the mechanism should be reduced to a minimum to avoid wear, and wastage of power. It is usual to employ a spring for engaging or disengaging the clutch, and this spring is liable to cause rubbing and friction at its associated abutment surfaces. According to a preferred feature of the invention the spring is positioned between two parts connected respectively to the two clutch members, one part being connected to the respective clutch member in a manner permitting relative rotation, and including two abutment surfaces for limiting the relative axial movement of the two parts, one of the two abutment surfaces being connected to the respective clutch member in a manner permitting relative rotation.

In some constructions according to the invention the friction clutch may be arranged in series in the path of flow of any air escaping from or leaking into the ram cylinder past the ram piston. In any case the friction clutch preferably comprises an annular friction member of tapered cross-section, positioned between correspondingly tapered surfaces on two clutch members. Preferably also the axial reaction thrust of the machine acts in a direction tending to engage the clutch.

In another possible construction the thermally-responsive device is carried by the rotary machine and acts directly on the clutch. The device may be a wax capsule and is preferably in thermal contact with a heat-sink or radiator exposed to the air flowing through the machine.

In the case of an air cooled engine the thermally-responsive means may be situated in the air stream created by the fan but preferably the temperature responsive means is located remote from the fan itself and it may be situated on a part of the engine such as an engine cylinder block.

The invention may be performed in various ways and two specific embodiments with certain possible modifications will now be described by way of example with reference to the accompanying drawings, in which FIGURE 1 is a side elevation partly in section through a pneumatically operated clutch incorporated into the hub of a cooling fan, FIGURE 2 is a diagrammatic illustration showing a pneumatically operated clutch of the type illustrated in FIGURE 1 incorporated in the cooling system of a vehicle engine, and FIGURE 3 is a sectional side elevation through an alternative form of clutch designed to be operated by vacuum.

Referring first to FIGURE 2, an internal combustion engine 10 for a vehicle is arranged to drive a cooling fan having fixed pitch blades 11, through a fan drive shaft 12 and a pneumatically operated clutch indicated generally at 13. The fan is arranged to draw cooling air through a radiator 14, and cooling water circulates through a water jacket surrounding the engine 10 and the radiator 14 via upper and lower radiator connections 15, 16. A thermal valve 17 is positoined in the wall of the lower radiator connection 16 and has a thermally responsive element such as a wax capsule, which is sensitive to the temperature of water leaving the radiator. This thermal valve controls the admission of compressed air from a compressed air source 18, which may be the compressed air reservoir for the vehicle brakes. When the water temperature in the lower radiator connection 16 exceeds a predetermined value the thermal valve 17 opens admitting compressed air to a line 19 connected to the pneumatically operated clutch 13 incorporated in the hub of the fan, so as to engage the clutch and cause the fan to be driven. When the temperature of the water in the lower radiator connection 16 falls below a predetermined value the thermal valve 17 closes shutting off the compressed air supply 13 and the fan is then effectively disconnected from the drive shaft 12.

Referring now to FIGURE 1, which illustrates a constructional form of the clutch 13, the fixed pitch fan blades 11 are secured to an annular hub disc 25 which is resiliently supported from a driven casing member 26 which carries a part of the clutch and also constitutes part of the pneumatic operating cylinder of the clutch. The casing member 26 has a forwardly extending cylindrical portion 27, constituting the pneumatic ram cylinder, an annular radial flange 28 and a rear cylindrical flange 29. On the rear side of the radial flange 28 there is positioned an annular abutment disc 30 having a series of forwardly projecting bosses 31 which are internally screw-threaded, and the fan disc 25 is clamped to the flange 28 of the casing 26 by a series of six circumferentially spaced bolts 32 whose heads engage a front clamping plate 33, the threaded portions of the bolts being engaged in the threaded bosses 31. The fan disc 25 is flexibly and resiliently mounted between two annular rubber members 34, 35 which are located between the parts 33 and 28 and placed in compression as the bolts 32 are tightened, and the inner peripheral edge of the disc 25 is also resiliently supported by a rubber ring 36. A spacer sleeve 37 loosely surrounding each bolt 32 determines the degree of compression of the rubber members 34, 35 and also provides an abutment against which each bolt can be tightened. It will be noted that the fan disc 25 is formed with oversize apertures 38 surrounding each sleeve 37 with appreciable clearance thus permitting the necessary degree of flexibility of the fan disc relative to the casing 26. The movements of the fan disc are absorbed primarily by shear strain in the rubber elements 34, 35, 36.

The cylindrical rear flange 29 on the casing 26 accommodates a split friction ring 40, of trapezoidal cross-section, having a tapered internal surface 41. This friction ring is located by an annular locking piece 42 secured by a spring ring 43 and the front edge of the friction ring abuts against a spacer member 44.

The driving member of the clutch is in the form of a metal pressing 50 having a flat annular part adapted to be secured by bolts 51 to the driving flange 49 on the front end of the drive shaft 12 of the vehicle engine. The outer lip 52 of this member 50 is inclined forwardly and outwardly to co-operate with the tapered surface 41 on the friction ring 40 and it will be seen that when the friction ring 40 moves forwardly it will engage the lip 52. The driving member 50 of the clutch is also formed integral with a cylindrical extension 53, constituting the pneumatic ram piston, and the cylindrical extension 27 on the casing 26 is supported on and around this extension 53 by means of two needle roller bearings 54, 55. The forward end of the extension 53 is inturned at 56 and a helical compression spring 57 acts between this inturned lip 56 and a movable abutment sleeve 58. The sleeve 58 has two diametrically opposed apertures which receive a transverse pin 59, which also passes through an elongated slot 60 in the cylindrical extension 53, the outer ends of the pin being received in apertures in a spacer sleeve 61 located between the needle roller bearings 54, 55.

It will be seen that the compression spring 57 acts through the abutment sleeve 58 to urge the pin 59 rearwardly towards the rear side of the slot 60, and this spring force is transmitted from the spacer sleeve 61 and the rear bearing 55 to the abutment plate 30 which is clamped to the casing 26. The spring thus tends to urge the casing 26 and the friction ring 40 rearwardly in relation to the driving member 50, and thus tends to disengage the friction ring 40 from the driving lip 52. When the pin 59 engages the rear end of the slot 60 in the cylindrical extension 53 the spring force is however completely absorbed between the lip 56 at the front end of the extension and the rear end of the slot, which is then engaged by the pin 59. Thus the spring force is self-contained and is removed from the friction ring 40.

Compressed air to operate the clutch is admitted from the line 19 via a hollow air inlet spigot 65 positioned on the centre line of the fan. The spigot is supported by an oil impregnated bushing 66 carried within a cylindrical portion 67 of a pressing 68, whose outer periphery 69 is formed to seat within the cylindrical extension 27 of the casing 26. This peripheral part 69 is located between an inturned lip 70 on the part 27 and a spacer element 71 which also engages the front end of the bearing 54. The rear or inner end of the spigot 65 is provided with a steel bearing disc 72 located by a circlip 73, so as to engage a flange at the rear end of the bushing 66 and a sealing member 74 surrounds the front portion of the hollow spigot 65 and forms an air tight seal with the pressing 68. The disc 72 has a non-circular aperture preventing it from rotating.

When compressed air is admitted through the line 19 it enters the space within the cylindrical extension 53 of the driving member, and it will be appreciated that the rear end of this space is closed by the driving flange 49 on the drive shaft. The compressed air passes through a series of ports 75 in the cylindrical extension 53 and to the rear side 76 of a sealing flange 77 on an axially movable sealing member 78. This sealing member 78 also carries an O-ring seal 79 engaging the external surface of a shoulder 80 formed on the extension 53. The compressed air passing through the ports 75 and acting on the rear face of the sealing flange 77 urges the sealing member 78 forwardly to form a face seal with the abutment disc 30 attached to the casing 26. The air within the interior of the cylindrical extension 53 is thus trapped and exerts a forward thrust on the pressing 68, which is thus transmitted to the casing 26 and acts to move the casing forwardly the small distance necessary to engage the friction ring 40 with the driving lip 52. It will also be noted that the reaction thrust of the fan blades, acting forwardly, is in a direction to assist this engagement. The clutch thus engages and the fan is driven by the drive shaft.

During this engaging operation the pin 59 is moved forwardly with the casing 26 and the spring 57 is slightly compressed. It will be noted that the sealing member 78 in these conditions is in sealing contact both with the abutment member 30 and the shoulder 80 on the driving member, and rotates with both these parts. It will also be noted that the effective diameter of the clutch surfaces, that is to say the friction ring 40, is considerably greater than the overall diameter of the pneumatic ram, which in this construction is determined by the sealing member 78. The large diameter of the friction ring allows large driving torques to be transmitted as is essential in cooling fans for vehicle engines of large horsepower.

The compressed air within the interior of the cylindrical extension 53 also acts on the rear face of the bearing disc 72 on the inner end of the hollow spigot 65, urging this disc forwardly to form an effective air seal with the rear flange of the bushing 66. The air pressure may however tend to cause the oil within the pores of the bushing to be exuded forwardly. Accordingly an air balancing passage 81 is formed in the cylindrical mounting part 67 on the forward side of the bushing 66 but on the rear side of the air seal 74. As a result the air pressure is exerted on both ends of the bushing 66 thus preventing oil from being driven out of the pores of the bushing.

When the thermal valve 17 shuts off the supply of compressed air to the line 19 the valve also connects this line 19 to exhaust and accordingly the compressed air within the cylindrical extension 53 escapes through the hollow spigot 65. The spring 57 acting rearwardly on the pin 59 causes the casing 26 to move rearwardly until the friction ring 40 disengages from the driving lip 52. The compressed air within the space 76 also escapes through the port 75, and the sealing member 78, which is no longer urged forwardly by air pressure, automatically disengages slightly from the abutment disc 30 and merely rotates with the driving flange 50. Thus there is no rubbing friction between the flange 77 and the disc 30, which would cause wear.

It will be seen that when the clutch is disengaged the only interconnection between the rotating and non-rotating parts is by way of the two roller bearings 54, 55, and between the bushing 66 and the hollow spigot 65. The latter is of extremely small diameter and is located on the axis of rotation so that wear and friction are reduced to a minimum. Moreover it will be noted that the design illustrated is particularly convenient for production from sheet metal pressings.

In the alternative embodiment illustrated in FIGURE 3 the clutch is designed to be operated by vacuum instead of compressed air. The annular fan disc 125 is again attached to a casing 126 by means of bolts 127, the fan disc being resiliently supported by rubber rings 128. The casing 126 has a forwardly extending cylindrical extension 129 and a rear frusto-conical flange 130, which constitutes the driven element of the clutch. The driving element of the clutch is in the form of a plate 131 secured by bolts 132 to a drive shaft 133, which in this example is connected to a water pump 134 driven by means of a V-belt (not shown) running in a hollow pulley 135. A friction ring 137 is positioned between the driving plate 131 and the driven flange 130. In this embodiment the driving flange 131 also has a cylindrical extension 138, the cylindrical portion 129 of the casing 126 being carried from this extension on two spaced bearings 139, 140. A compression spring 141 acts between an abutment flange 142 on the extension 138 and a sleeve 143 carrying two transverse pins 144 located in elongated slots in the extension 138. The pins 144 correspond in function to the pin 59 of FIGURE 2. Thus the spring tends to force the casing 126 forwardly in relation to the drive shaft 133, so as to disengage the clutch. In this embodiment a rear air seal is provided on the rear side of the friction ring 137. This seal comprises an annular sealing member 150 located in a channel between the driving flange 131 and a locating plate 151, the sealing member 150 having a peripheral groove accommodating an O-ring 152 which seals against the driven flange 130. When suction is exerted within the clutch housing the sealing member is urged forwardly against the part 137 forming a face-seal to prevent entry of air.

Thus in operation when suction is applied to the line 19, and via hollow spigot 65 to the interior of the hollow extension 138, the whole of the interior of the casing 126 is subject to vacuum or reduced pressure and the casing moves rearwardly to engage the driven flange 130 with the friction ring 137. At the same time the spring 143 is slightly compressed. The clutch is then engaged. When the suction is released air is admitted through the line 19 and the spring 143 urges the casing 126 forwardly to disengage the clutch. When disengaged the annular sealing member 150 is not subject to any axial loads and thus is free to separate from its opposite axial locating surfaces so as to reduce friction and wear. On the other hand when the clutch is engaged the annular sealing member 150 is engaged by the rear face of the friction ring and thus forms a face seal therewith.

In a further possible modification, not illustrated, the clutch is operated by a thermal valve mounted directly on the hollow spigot 65, so as to be exposed to the air being impelled by the fan blades 11. The temperature of this cooling air, after passing through the radiator 14, will vary with variations in the water temperature and will thus provide an automatic control of the clutch so as to maintain the water temperature within selected limits.

If applied to an air cooled engine having no water jacket the thermally responsive element of the thermal valve may be mounted directly on the engine block thus sensing the engine temperature. In some cases the thermal valve may be replaced by a solenoid actuated valve controlled by a thermally responsive electric switch.

I claim:
1. A rotary fan comprising a friction clutch and a pneumatic ram for controlling the actuation of the clutch, the clutch and ram both being capable of rotation with the fan, means for connecting the clutch to an input shaft at one end of the fan, and rotary fluid coupling means at the other end of the fan for actuating the ram, to control engagement and disengagement of said clutch, the fluid coupling means being mounted on the rotary axis of the fan and passing through an end wall of the ram.

2. A fan as claimed in claim 1, in which the axial reaction thrust on the blades of the fan acts in a direction to engage the friction clutch.

3. A fan as claimed in claim 1, in which the ram comprises a piston and a cylinder and in which the piston of the ram and one part of the clutch are fixed axially with respect to the shaft connecting means, and the cylinder of the ram, the other part of the clutch, and a hub assembly supporting the fan blades, are movable axially relative thereto.

4. A fan as claimed in claim 1, in which the fluid coupling means for the ram passes through a member connected to rotate with the driven part of the clutch.

5. A fan as claimed in claim 1, including means for controlling the actuation of the ram automatically by means of a thermally-responsive device.

6. A fan as claimed in claim 1, in which the friction clutch is arranged in series in the path of flow of any air escaping from or leaking into the ram.

7. A fan as claimed in claim 1, in which the friction clutch includes an annular friction member which is of greater diameter than the ram.

8. A fan as claimed in claim 1, in which the friction clutch comprises an annular friction member of tapered cross-section, positioned between correspondingly tapered surfaces on two clutch members.

9. A fan as claimed in claim 1, including a spring resisting the engagement of the clutch, the spring being positioned between two parts connected respectively to the two clutch members, one part being connected to the respective clutch member in a manner permitting relative rotation, and including two abutment surfaces for limiting the relative axial movement of the two parts, one of the two abutment surfaces being connected to the respective clutch member in a manner permitting relative rotation.

10. A fan as claimed in claim 1, forming part of a cooling system for an engine, including a radiator through which the fan impels cooling air, and a thermally-responsive element sensitive to the temperature of the coolant, for controlling the ram of the fan.

11. A fan as claimed in claim 1, in which the ram comprises piston and cylinder members and in which the two operative parts of the clutch are connected to rotate respectively with the piston and cylinder members of the pneumatic ram.

References Cited

UNITED STATES PATENTS

| | | | |
|---|---|---|---|
| 2,739,655 | 3/1956 | Petty | 170—160.32 |
| 3,103,308 | 9/1963 | Wolfram | 123—41.12 X |
| 3,323,596 | 6/1967 | Mobius | 170—160.13 X |
| 2,022,709 | 12/1935 | Embery et al. | 123—41.12 |
| 2,553,214 | 5/1951 | Sanders | 123—41.12 |
| 2,637,308 | 5/1953 | Dodge | 123—41.12 X |
| 2,661,148 | 12/1953 | Englander | 123—41.12 X |
| 2,725,185 | 11/1955 | Willcox | 123—41.12 X |
| 3,014,568 | 12/1961 | Peras | 123—41.12 X |

FOREIGN PATENTS

| | | |
|---|---|---|
| 1,401,423 | 4/1965 | France. |
| 1,009,662 | 11/1965 | Great Britain. |

AL LAWRENCE SMITH, Primary Examiner

U.S. Cl. X.R.

170—160.13, 160.32; 192—82; 236—35